Inventor:
Reinhold C. Zeidler

April 7, 1953 R. C. ZEIDLER 2,633,952
SPRAG TYPE CLUTCH
Filed Dec. 6, 1946 3 Sheets-Sheet 2

Inventor:
Reinhold C. Zeidler

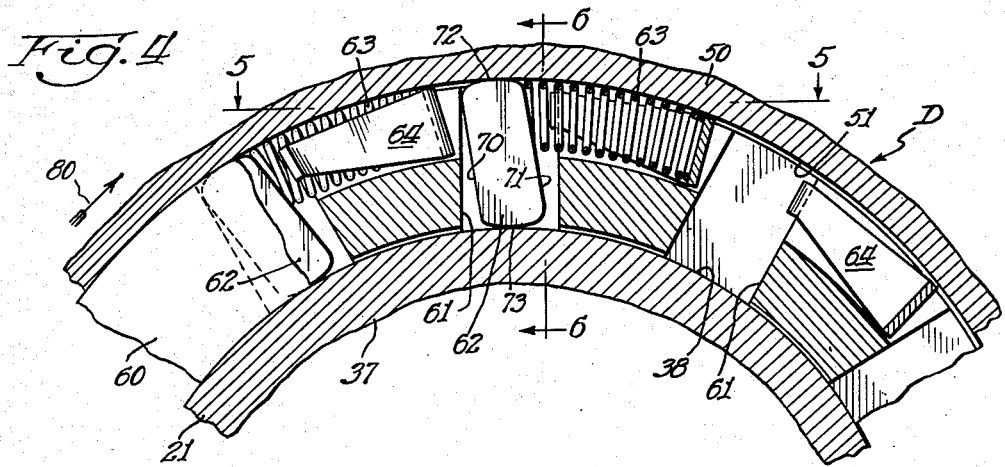
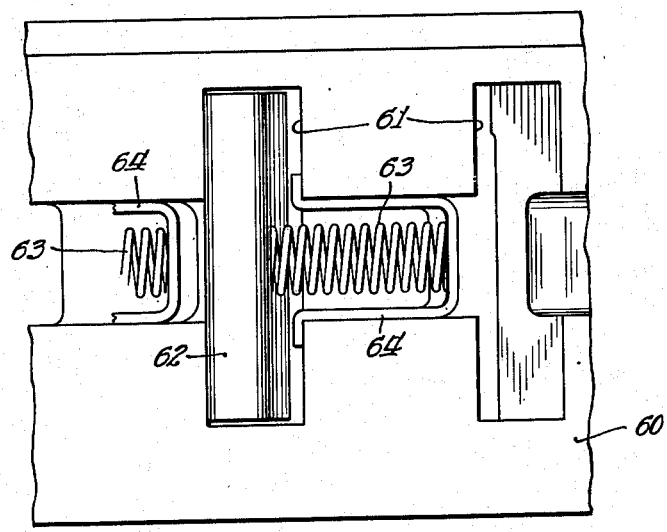
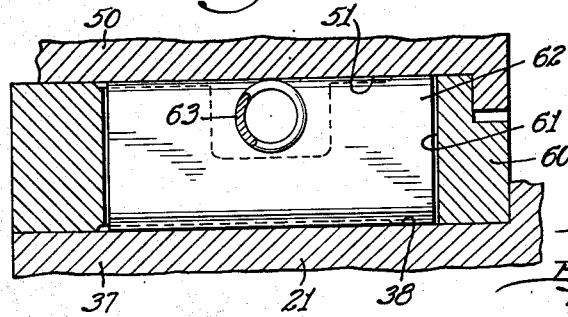

Patented Apr. 7, 1953

2,633,952

UNITED STATES PATENT OFFICE 2,633,952

SPRAG TYPE CLUTCH

Reinhold C. Zeidler, Detroit, Mich., assignor to Borg-Warner Corporation, Chicago, Ill., a corporation of Illinois Application December 6, 1946, Serial No. 714,565

2 Claims. (Cl. 192—45.1)

This invention relates to clutches and driving mechanisms therefor, and refers more particularly to improvements in fluid clutches and controls therefor.

Heretofore, it has been customary in clutches of the fluid type to rely solely on the fluid circulated between the driving and driven clutch vane members to establish the driving connection through the clutch at substantially all speeds of operation thereof, and particularly at relatively high speeds of rotation. At low speeds, a certain amount of slipping between the clutch members is ordinarily desirable in smoothly picking up the load between the driving and driven clutch members and the fluid clutch is of advantage in permitting such slippage without the wear usually attendant to more common forms of friction clutches.

By way of example, clutches of the aforesaid type may be advantageously employed in transmitting power from an engine of a motor vehicle to a speed changing transmission, and when so used it is apparent that much of the motor vehicle operation is under conditions of direct drive through the clutch.

My invention has particular significance in connection with motor vehicle clutches of the aforesaid type, although it is not limited thereto in its broader aspects; one object thereof residing in the provision of means for drivingly connecting the clutch members in addition to the driving connection afforded by the fluid circulated by the clutch.

The invention seeks, as a principal object and accomplishment, to provide a fluid drive mechanism having positive drive means to lock out the fluid drive at speeds above a predetermined point, said lockout incorporating an improved overrunning clutch mechanism.

Another object of the invention is to provide a fluid drive mechanism particularly adapted for employment in connection with a semi-automatic transmission of the type in which an automatic shift from starting gear to direct drive is effected by accelerator manipulation, and which is adapted to respond to the same accelerator manipulation to effect the lock-up simultaneously with the establishment of the direct drive.

A further object of my invention resides in the provision of a clutch having a coupling mechanism associated therewith, the coupling being adapted to automatically engage and disengage the clutch with respect to the clutch driving means. This feature of my invention is especially adapted for use in connection with fluid clutches although, in the broader aspects of my invention other types of clutches may be advantageously employed. This coupling mechanism is preferably in the form of a centrifugally actuated lock-up means responsive in its actuation to the speed of the rotation of the driving means such as the engine.

The invention has for a further object the provision of a fluid drive mechanism of the character indicated, in which the shock of establishing the lock-up is cushioned by the fluid drive, in other words, in which the fluid drive takes the reverse torque reaction deferred in the establishment of the positive drive.

A still further object of the invention is to provide a fluid drive which, in addition to the above-named characteristics provides a positive drive which is of the free-wheeling type and yet substantially eliminates the "back lash feeling" inherent in the conventional free-wheeling drive and at the same time permits the braking effect of the engine to be at least partially utilized at all times.

A feature of the present invention is to provide an improved overrunning clutch of the sprag type wherein the sprags are provided with individual springs arranged and mounted in a novel manner thereby to eliminate the possibility of a spring becoming detached and being free to interfere with the function and operation of other springs in the event of an individual spring failure.

The invention seeks, as a still further object, to provide a clutch mechanism such as contemplated herein and characterized by a combination of parts arranged and adapted to provide a compact assembly which will successfully combine the factors of structural simplicity, efficiency and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner hereinafter fully described and as more particularly pointed out in the appended claims, reference being had to the accompanying drawings which form a part of this specification, wherein:

Fig. 4 is a fragmentary sectional elevational view of the overrunning clutch and taken substantially on the plane of the line 4—4 in Fig. 1, and wherein certain parts are shown in section and broken away to more clearly show the construction thereof;

Fig. 5 is a fragmentary top plan view of the overunning clutch depicted in Fig. 4 and taken substantially on the plane of the line 5—5 in Fig. 4; and Fig. 6 is a fragmentary sectional elevational view of the overunning clutch taken on the plane of the line 6—6 in Fig. 4.

The drawings are to be understood as being more or less of a schematic character for the purpose of illustrating and disclosing a typical or preferred form of the improvement contemplated herein, and in the drawings like reference characters identify the same parts in the several views.

Figure 3:
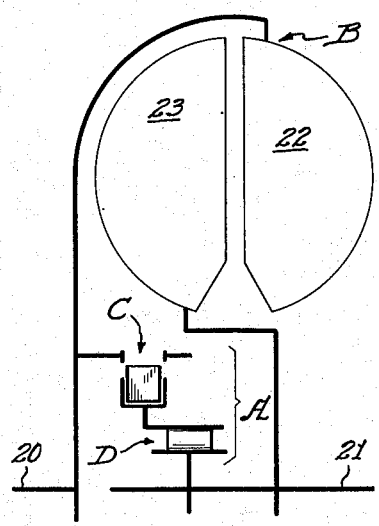
Fig. 3 is a schematic illustration of the power circuit of the clutch assembly depicted in Fig. 1.

As an example of one form in which the invention may be embodied, I have shown in Fig. 3, a schematic power circuit wherein I have provided a positive lock-up assembly designated in its entirety by the latter A and bridging a fluid coupling designated in its entirety by the letter B, i. e., in parallel therewith, as clearly shown. The positive lock-up A comprises generally a speed-responsive centrifugally actuated clutch C and an overrunning clutch D arranged in series between a crank shaft 20 and a driven shaft 21.

The fluid coupling B comprises, in general, an impeller 22 suitably connected to the crank shaft 20, and a runner 23 which is operatively mounted upon an intermediate, tubular driven shaft 21. The driven shaft 21 is adapted to drive a transmission shaft 24 through the medium of a friction clutch comprising the backing plate 24a and a conventional friction clutch disc (not shown). The impeller 22 and the runner 23 operatively cooperate to provide a fluid drive between the crank shaft 20 and the driven shaft 21.

The speed-responsive clutch C is adapted to transmit forward drive from the shaft 20 to the overrunning clutch D at certain predetermined speeds of rotation and said overrunning clutch is adapted to release under a reversal of rotation of this drive. The overunnning action of the clutch D permits the fluid drive B to cushion the engagement of the speed-responsive clutch C and also functions to facilitate release of the speed-responsive clutch C as will be pointed out more in detail hereinafter.

Having thus generally described the clutch mechanism of the invention, the specific construction and cooperating functions of the parts thereof will now be described in detail.

Figure 1:
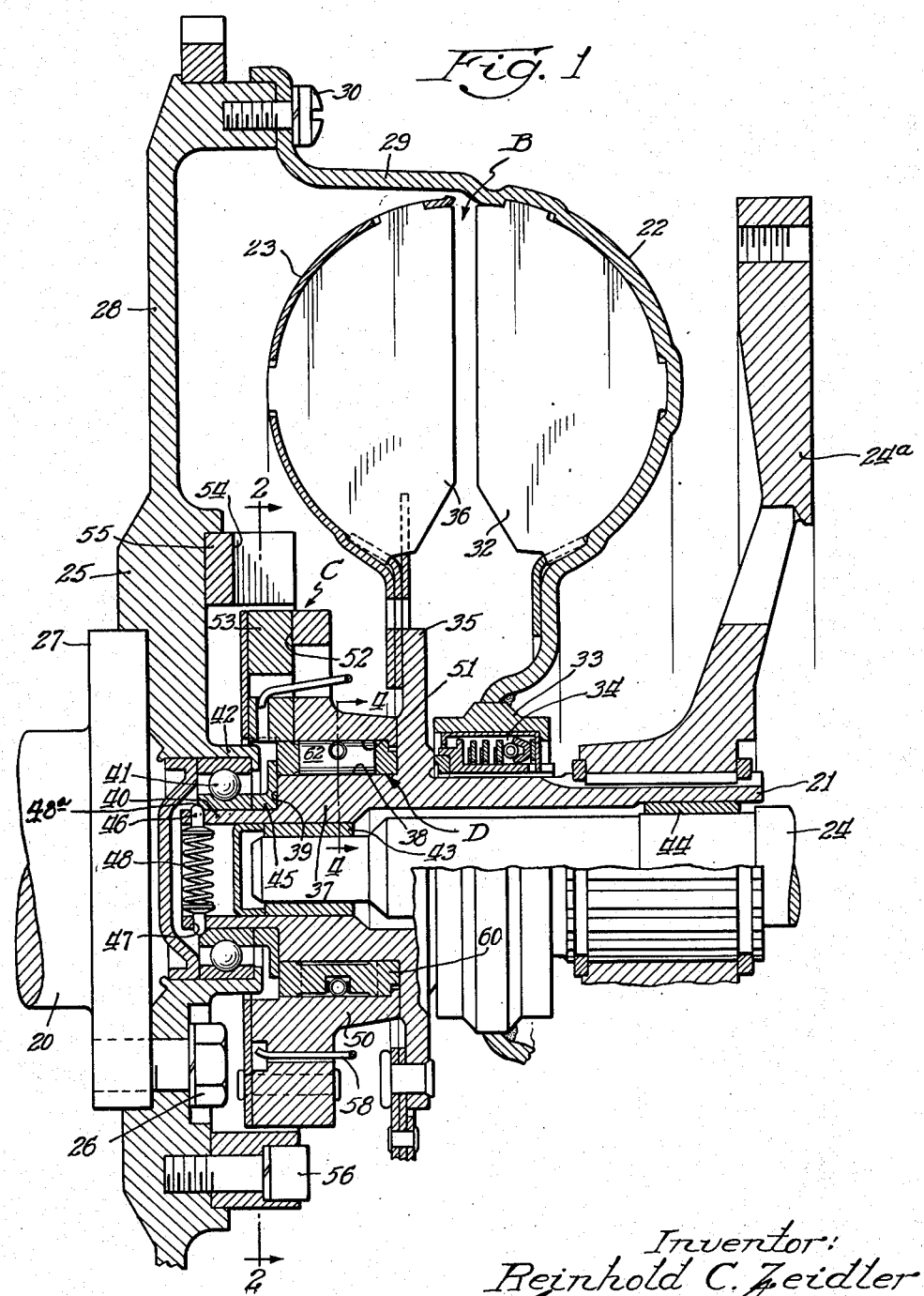
Fig. 1 is a sectional view of a fluid clutch mechanism embodying the present invention.

Referring to Fig. 1, the fluid coupling B illustrated includes a hub 25 demountably secured by means of cap screws 26 to a mounting flange 27 integrally formed on the crank shaft 20, the hub being provided with an integral radially extending flange 28 to which one end of a fluid housing 29 is removably secured by means of suitable cap screws as at 30.

The housing 29 may be of a somewhat semi-toroidal shape in cross section or it may take other forms as required by the service. The driving vanes 32 of the impeller 22 are preferably of a semi-circular contour and have their arcuate or segmental edges suitably anchored to the corresponding arcuate portions of the housing 29.

The radially inner region of the housing terminates in a hollow boss 33 containing suitable sealing means 34 such as, for example, a plurality of waved spring washers for pressing a seal against an adjacent surface of the driven assembly.

The driven assembly comprises the tubular shaft 21 which is provided with an integral radially outwardly extending annular flange 35 intermediate its ends, which flange is adaptable to support the runner 23 which carries the plates or vanes such as at 36.

Forwardly of the flange 35, the shaft 21 is provided with a hub portion 37 defining a smooth peripheral surface 38 cylindrical in cross section, the function of which in cooperation with the sprag type overrunning clutch D will be hereinafter more fully described. The surface 38 extends axially of the shaft 21 forwardly from the flange 35 and terminates in an abutment shoulder 39. Forwardly of the abutment shoulder 39, the shaft 21 is provided with a reduced end 40 piloted by means of an anti-friction bearing 41 adapted to be received in a central bore of the hub 25 defined by the inner flange 42. The shaft 24 is suitably journaled within the shaft 21 by means of bearings 43 and 44. A suitable washer as at 45 is provided to keep the bearing 41 spaced from the abutment shoulder 39.

For the purpose of retaining the hub 25 and the driven shaft 21 in proper relation to the bearing 41 and for facilitating the insertion and withdrawal of the reduced end 40 of the shaft 21 from its normally operative position, a suitable detent arrangement is provided which comprises, in general, headed plungers 46 the shanks of which are guided in radial apertures 47 at the inner end region of the reduced end 40 of the shaft 21, and a suitable spring 48 which is compressed between the heads of the plungers to urge them in a radially outward direction to normally project beyond the outer surface of the reduced end 40. As seen in detail in Fig. 1, the inner corner portions of the bearing 41 are chamfered as at 48a so that, when the end of the reduced end 40 is removed from said bearing by a suitable force exerted in a direction axially of the assembly, specifically to the right as seen in Fig. 1, these detents or plungers 46 will engage said chamfered region and will be retracted into their guide apertures 47 when the reduced end 40 is forced or removed from said bearing.

Figure 2:
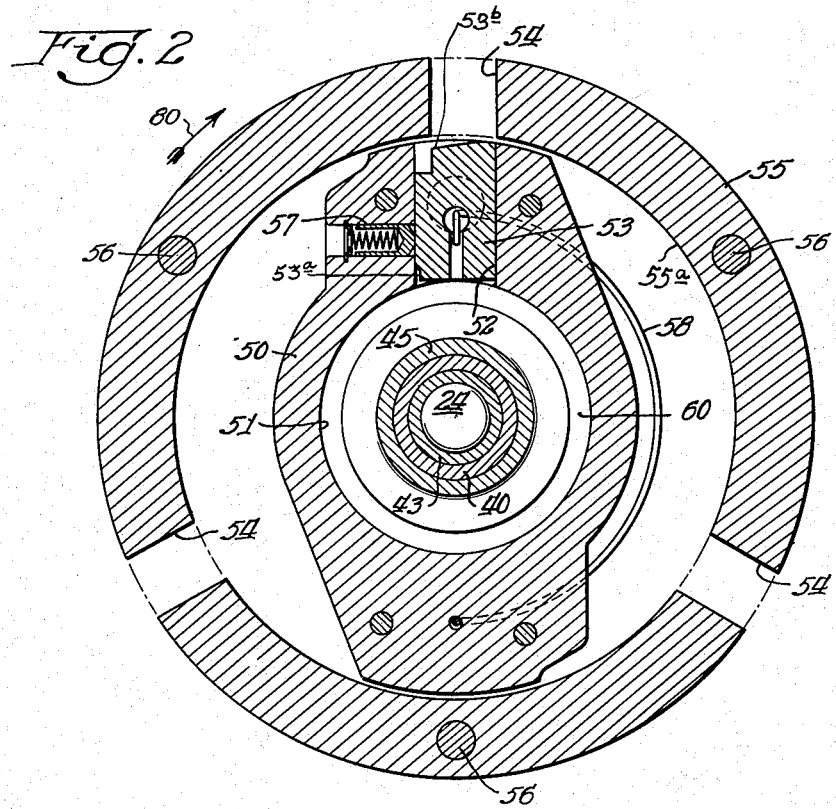
Fig. 2 is a sectional elevational view of the lock-up and one-way clutch mechanisms of the clutch assembly depicted in Fig. 1 and taken substantially on the plane of the line 2—2 in Fig. 1.

Referring to Figs. 1 and 2, the positive lock-up mechanism A comprises an annulus 50 common to both of the clutches C and D, the annulus being provided with a central bore 51 defining a smooth cylindrical surface adapted to receive the overrunning clutch assembly D which will be hereinafter described more in detail.

The annulus 50 is provided with a recess 52 adapted to receive a suitable pawl 53 suitably mounted for radial movement outwardly by centrifugal force when a predetermined speed of rotation of the annulus is reached, whereupon the pawl 53 will be received into any one of a plurality of recesses 54 disposed in an outer annular member 55 secured to the hub 25 by means of cap screws 56. I have provided a suitable spring loaded plunger as at 57 to cause a slight frictional drag on pawl 53 to prevent its fluttering in and out when it is about to engage the slots 54. When the pawls are all the way out the plunger 57 engages a very slight recess as at 53a which creates a slightly greater friction to the pawls retracting so the speed at which they retract may be slightly less than the speed at which they move out.

A spring 58 formed of spring wire of suitable tension and thickness is provided to urge the pawl 53 radially inwardly to its normal inoperative position when the speed is reduced below the critical lock-up speed.

The invention provides, in combination with the features above described, the overrunning clutch D illustrated generally in Figs. 1 and 2 and in detail in Figs. 4, 5 and 6 comprising, in general, a sprag cage 60 operatively disposed between the surfaces 51 and 38 of the annulus 50 and the driven shaft 21, respectively, said cage being provided with a plurality of openings as at 61, each opening being adapted to receive a sprag 62 provided with individual spring means 63 arranged and assembled so that end portions of one end of said spring are in engagement with the sprag and the end portions of the opposite end of said spring are carried and held in a normal operative position by a spring retainer 64, thereby to cause suitable spring tension against the sprag when assembled in its operative position.

A feature of the invention is to utilize the sprag cage 60 as a supporting bearing between the annulus 50 and the driven shaft 21 to insure concentricity between these members. It is notable that the cage is free to rotate on the driven shaft 21, but frictional drag between the cage and the annulus 50 is desirable and advantageous. Such frictional drag may be caused by machining the surfaces of the cage in contact with the annulus 50 to define a snug fit, or by machining such surfaces so they will be free and thereafter seating the cage in a suitable press (not shown) to make the cage slightly oval shaped, thereby necessitating springing the cage into the bore of the annulus 50 into its operative position. The annulus being rigid and concentric would then cause the cage to assume a concentric shape.

Frictional drag between the cage 60 and the annulus 50 is advantageous and desirable to insure minimum movement between these members, thus eliminating wear on the springs and spring retainer. The minimum movement between these members would be caused when the sprags roll into engagement, thereby causing a very slight movement of the cage relative to the annulus 50. This feature would continue to bring new areas of the surface 51 into contact with the sprag. Since there is only a relatively small movement between these members when overrunning at high R. P. M. centrifugal force will throw the sprags against the relatively non-rotating member or annulus 50, thereby minimizing wear of the sprags at their contact points with the driven member 21.

In accordance with this invention, the sprags 62 are prismatic in section, having straight parallel sides 70 and 71 and ends as at 72 and 73 formed on circular arcs struck about centers spaced widthwise of the sprags so that the diagonal length in one direction is greater than that in the other direction, thereby to cause the wedging angle to increase as the grip on the sprags tightens, which increases the torque capacity of the clutch. It is notable that the sprags are symmetrical to reduce cost and facilitate easy assembly, and no holes or notches are found in them which would weaken them or increase the cost of manufacture.

The sprags 62 normally lie at angles to radial lines struck through the center of the driven shaft 21, as shown in Fig. 4, and when tilted in this position, will permit counterclockwise rotation of the annulus 50 relative to the driven shaft 21. If the annulus 50 should attempt to turn clockwise relative to the driven shaft 21, or if the driven shaft 21 should lag behind the annulus 50, the sprags 62 will be locked to a more nearly radial position and will bind against the surfaces 51 and 38 to hold the annulus and the driven shaft against relative rotation with respect to each other.

It has been found advantageous and particularly desirable to provide a uniform resilient pressure against each of the sprags which will cause the proper seating thereof and hold them in their operative positions. It is particularly desirable to provide a slight pressure at the center of the sprag, as shown in Figs. 5 and 6, which will cause the side of the sprag at 70 near outer portion 72 to abut against the side of opening 61 to hold the sprag parallel with the axis of the driven shaft at all times to facilitate proper seating of the ends 72 and 73 of the sprags against their respective related races, specifically, the surfaces 51 and 38. This feature is advantageously accomplished in the present invention by the employment of spring means 63 comprising a wire spring of suitable thickness and tension, and having portions at one end in engagement with the sprag, and having portions at the opposite end carried by and held in its normal operative position by the U-shaped spring retainer as at 64, thereby to cause suitable spring tension against the sprag when assembled in its operative position. With this construction and arrangement of parts, quick positive action in the proper seating and wedging of the sprags between the annulus 50 and the driven shaft 21 is accomplished.

It is particularly notable that with this construction and arrangement of parts, the overrunning clutch may be made in comparatively small dimensions. Heretofore, with arrangements found in the prior art it was not practical to construct a clutch of small dimensions as found in the present invention, and yet have the advantages found in the present invention.

The fluid coupling contemplated herein is adapted to provide a fluid drive in the starting range of speeds, thereby securing the particular advantages of an automatic, cushioned engagement between the driving and driven members in the transmission of torque in such starting range. While the fluid drive is in operation the annulus 50 will rotate as a unit with the driven shaft 21, since the sprags 62 of the overrunning clutch will be in their operative position in wedging engagement with the surfaces 51 and 38 of the annulus 50 and the driven shaft 21, respectively. At the same time, the centrifugally actuated pawl 53 will be restrained in its retracted or inoperative position in the recess 52 of the annulus 50 by the spring 58 as shown in full lines in Fig. 3. When the critical lock-up speed has been exceeded, the centrifugal force developed in the pawl 53 will exceed the restraining force of the spring 58 plus the slight friction caused by plunger 57 and the pawl will then move radially outwardly to the position where it can be received into any one of a plurality of recesses 54 in the annular member 55.

At this stage and until synchronization actually occurs, the pawls skip over the openings 54 in a practically noiseless manner. This is accomplished by making the opening 54 just slightly greater than the width of the pawl portion which enters it and providing the end of the pawl with a slight ramp declining to its leading edge. It has been found by calculations and experiments that when the pawls are pressing radially against the inner surface 55a of the annular member 55 and seeking to engage openings 54, as the trailing edge of the pawl slips over the edge of opening 54 by virtue of the clearance at the leading edge, the pawls cannot accelerate quickly enough to cause engagement. Such action will occur as a result of slippage taking place between the driving and driven shafts as long as the drive is through the fluid, the driving assembly, including the annular member 55, rotating ahead of the driven assembly including the centrifugal pawl 53, in the direction indicated by the arrow 80 in Figs. 3 and 4. The lock-up drive may now be established at any time after the critical lock-up speed has been exceeded by reversing the torque. Such reversal may be accomplished by decelerating the engine, for example, by releasing the accelerator and consequently causing the driving member to decrease in speed. When it has reached a speed equal to or less than that of the driven member, the centrifugally actuated pawl 53 will then move radially outwardly into any one of a plurality of recesses 54 in the annular member 55. With the pawls thus engaged the driving member speed can continue to fall off without any disturbance being felt by virtue of the clutch D now overrunning.

It is particularly notable that in the absence of an overrunning clutch D, the continued deceleration of the driving assembly resulting from the brake action produced by the compression and friction in the engine would produce what may be termed a reverse torque shock under the engagement of centrifugally actuated pawl 53 with the recess 54. The overrunning clutch D eliminates this reverse torque shock by releasing the annulus 50, and permitting it to rotate with the driving assembly, whereupon, the only resistance to the reverse torque load then will be the reverse drive through the fluid. Thus the fluid drive permits the overrunning clutch D to operate so as to eliminate the reverse torque shock, and since the fluid drive is constantly effective between the shafts, although reduced to coasting drive at synchronization it will cushion the release of the overrunning clutch by resisting the overrunning action, thus eliminating any "back lash feeling" which might arise in the release of the overrunning clutch and the reengagement thereof upon the resumption of the forward power flow from the engine.

With this construction there is provided a limited amount of free-wheeling action while the speed-responsive clutch remains in operative engagement; however, such free-wheeling is of a modified type as compared to that of a conventional free-wheeling transmission since it is opposed by the reverse drive through the fluid coupling and permits only such difference in speed between the driving assembly and the driven assembly as is provided by the slip in the coupling at such speed. This arrangement, however, has the particular advantage of eliminating transmission rattles which in a six-cylinder automobile are apt to be troublesome in coasting, for example, from speeds of 55 down to 35 miles per hour. Such transmission rattles which may develop at low speed are, of course, eliminated by driving through the fluid in the starting range of speeds.

It is particularly notable that the overrunning drive is of such a character that the braking effect of the engine may be advantageously employed in coasting down inclines and a particular advantage of the arrangement is that the faster the coasting speed becomes, the greater will be the transmission of brake effect through the fluid drive, since the brake effect will increase with the speed up to the stall speed of the coupling, and the differential between speed of the engine and of the transmission will consequently tend to decrease.

Now adverting to the speed-responsive clutch, it is notable that where the vehicle is permitted to coast down to a point below the critical lock-up speed, the centrifugally actuated clutch C will automatically release as a result of the functioning of the overrunning clutch D, and it is particularly notable that in the absence of the overrunning clutch, the coast load acting between the driving and driven members of the centrifugally actuated clutch C, specifically, the annular member 55 and the annulus 50 would be sufficient to prevent the retraction of the centrifugally actuated pawl 53 to its normally inoperative position in the recess 52 until idling speed had been reached. In such a case, if the accelerator were quickly depressed, such as, for example, when it is desired to speed up the motor vehicle, the driving torque would properly catch the pawl before it could retract to its inoperative position and the mechanism would then transmit positive drive instead of fluid drive at a low speed where fluid drive is particularly desirable; however, in the arrangement of my invention, I have provided the coast load to be taken through the fluid drive, thereby no coast load will be transmitted through the centrifugally actuated clutch. Accordingly, with the construction found in my invention, the centrifugally actuated clutch may release at any time below the critical speed.

While I have illustrated a preferred embodiment of my invention, many modifications may be made without departing from the spirit of the invention, and I do not wish to be limited to the precise details of construction set forth, but desire to avail myself of all changes within the scope of the appended claims.

I claim:

1. In a one-way engaging means, a plurality of sprags; an annular element having a plurality of spaced elongated openings therein extending transversely thereof for receiving said sprags and a slot extending circumferentially of said element and intersecting said openings; individual spring means engaging each sprag and urging the same toward one side of the opening receiving the same; and a floating retainer for each spring means and loosely mounted in said annular element and retained therein by said spring means, said retainer comprising a U-shape member disposed within said slot and receiving the associated spring means, said member having the spring means engaging the bottom thereof and having its free end portions extending within the adjacent opening and maintained in engagement with the other side of said associated opening by compression of said spring means between the engaged sprag and the bottom of said member.

2. In a one-way engaging means, a plurality of sprags; an annular element having a plurality of spaced elongated openings therein extending transversely thereof for receiving said sprags and a slot extending circumferentially of said element and intersecting said openings; individual spring means engaging each sprag and urging the same toward one side of the opening receiving the same; and a floating retainer for each spring means received within said slot and engaging said element, said retainer enclosing said spring means and being loosely mounted in said slot of said annular element and being retained therein by said spring means, said retainer being operative to exert pressure on said spring means to cause said spring means to be compressed between said retainer and the associated sprag to urge the associated sprag toward said one side of the opening receiving the same and to maintain said retainer engaged with said element.

REINHOLD C. ZEIDLER.

REFERENCES CITED

The following references are of record in the file of this patent:

UNITED STATES PATENTS

| Number | Name | Date |
|---|---|---|
| 2,366,842 | Dodge et al. | Jan. 9, 1945 |
| 2,366,843 | Dodge et al. | Jan. 9, 1945 |
| 2,386,285 | Zeidler | Oct. 9, 1945 |
| 2,404,221 | Dodge | July 16, 1946 |
| 2,428,962 | Davis | Oct. 14, 1947 |